(12) United States Patent
Bebeti et al.

(10) Patent No.: US 11,473,269 B2
(45) Date of Patent: Oct. 18, 2022

(54) ELECTRIC DRIVE ARRANGEMENT FOR WORK MACHINE

(71) Applicant: ZF Friedrichshafen AG, Friedrichshafen (DE)

(72) Inventors: Migen Bebeti, Passau (DE); Wolfgang Klinger, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/772,831

(22) PCT Filed: Nov. 19, 2018

(86) PCT No.: PCT/EP2018/081688
§ 371 (c)(1),
(2) Date: Jun. 15, 2020

(87) PCT Pub. No.: WO2019/120803
PCT Pub. Date: Jun. 27, 2019

(65) Prior Publication Data
US 2021/0164193 A1    Jun. 3, 2021

(30) Foreign Application Priority Data
Dec. 19, 2017    (DE) .................... 10 2017 223 158.0

(51) Int. Cl.
*B60K 17/02* (2006.01)
*E02F 9/20* (2006.01)
(Continued)

(52) U.S. Cl.
CPC ............. *E02F 9/202* (2013.01); *B60K 17/02* (2013.01); *B60K 17/08* (2013.01); *B60K 17/12* (2013.01)

(58) Field of Classification Search
None
See application file for complete search history.

(56) References Cited

U.S. PATENT DOCUMENTS 2,787,919 A * 4/1957 Senkowski ............... F16H 3/54
475/296
3,296,893 A * 1/1967 Shaffer .................... B66D 1/08
475/143
(Continued)

FOREIGN PATENT DOCUMENTS

CN    105508525 A  *  4/2016
CN    107020936 A  *  8/2017
(Continued)

OTHER PUBLICATIONS

Conversion of a gas combustion engine to an electric motor in a Porsche 912 (Year: 2015).*
(Continued)

*Primary Examiner* — Dirk Wright
(74) *Attorney, Agent, or Firm* — Leydig, Voit & Mayer, Ltd.

(57) ABSTRACT

An electric drive arrangement for a drive train of a work machine includes a multi gear transmission. The multi gear transmission includes at least two gears that provide different transmission ratios for various driving modes of the work machine, a multi gear transmission drive, and a multi gear transmission output configured to be mechanically coupled to an axle of the drive train. The electric drive arrangement further includes an electric motor configured to drive a driving movement of the work machine via a shaft that is mechanically coupled to the multi gear transmission drive of the multi gear transmission.

12 Claims, 2 Drawing Sheets

(51) Int. Cl.
*B60K 17/08* (2006.01)
*B60K 17/12* (2006.01)

(56) References Cited

U.S. PATENT DOCUMENTS

| | | | | |
|---|---|---|---|---|
| 3,811,342 | A * | 5/1974 | Barthel | F16H 61/0293 475/269 |
| 4,878,399 | A * | 11/1989 | Kameda | F16H 37/046 180/250 |
| 8,596,403 | B2 * | 12/2013 | Cunningham | B60K 1/00 180/300 |
| 9,205,734 | B1 * | 12/2015 | Leach | B60K 6/20 |
| 9,676,411 | B2 * | 6/2017 | Tigue | B60L 50/13 |
| 2003/0203782 | A1 | 10/2003 | Casey et al. | |
| 2007/0169970 | A1 * | 7/2007 | Kydd | B60L 50/16 903/903 |
| 2012/0215389 | A1 * | 8/2012 | Perry | H02K 15/03 903/903 |
| 2013/0168166 | A1 | 7/2013 | Konz et al. | |
| 2017/0029054 | A1 * | 2/2017 | Woodward | B60K 6/485 |
| 2017/0267093 | A1 | 9/2017 | Dorothy et al. | |
| 2019/0344660 | A1 * | 11/2019 | Kumar | B60K 7/0007 |

FOREIGN PATENT DOCUMENTS

| | | | | |
|---|---|---|---|---|
| DE | 102011001483 A1 | * | 5/2012 | |
| DE | 102011089021 A1 | * | 6/2013 | ........... B60K 17/046 |
| DE | 202014000738 U1 | | 3/2014 | |
| DE | 102013224223 A1 | | 5/2015 | |
| DE | 102016002592 A1 | | 9/2017 | |
| DE | 102017204269 A1 | | 9/2017 | |
| EP | 1192058 B1 | * | 11/2002 | ........... B60K 17/046 |
| JP | 63269734 A | * | 11/1988 | |
| JP | 01114530 A | * | 5/1989 | |
| JP | 04019231 A | * | 1/1992 | |
| JP | H 0526582 U | | 4/1993 | |
| JP | 2000035092 A | * | 2/2000 | .............. B60K 1/00 |
| KR | 20020017353 A | * | 3/2002 | |
| WO | WO-2017185901 A1 | * | 11/2017 | ............... B60K 1/00 |

OTHER PUBLICATIONS

Converting an internal combustion engine vehicle to an electric vehicle (Year: 2011).*
Top 7 issues for an electric car conversion (Year: 2009).*
Switching to electric engines sparks interest (Year: 2007).*
Convert an old car to a hybrid (Year: 1993).*

* cited by examiner

ELECTRIC DRIVE ARRANGEMENT FOR WORK MACHINE

CROSS REFERENCE TO RELATED APPLICATIONS

This application is a U.S. National Stage Application under 35 U.S.C. § 371 of International Application No. PCT/EP2018/081688 filed on Nov. 19, 2018, and claims benefit to German Patent Application No. DE 10 2017 223 158.0 filed on Dec. 19, 2017. The International Application was published in German on Jun. 27, 2019 as WO 2019/120803 A1 under PCT Article 21(2).

FIELD

The present invention relates to an electric drive arrangement for a drive train of a work machine, a drive train having such an electric drive arrangement, a work machine having such a drive train, and a method for retrofitting a work machine with an electric drive.

BACKGROUND

Work machines, by way of example wheel loaders, may comprise a drive train having a diesel motor that drives the wheels of the wheel loader via a multi gear transmission. The multi gear transmission may provide a working gear having high traction and also a road gear having high speed. The driver may select between these 2 driving modes by means of actuating the multi gear transmission. Work machines having an electric drive train have been developed in order to minimize pollutant emission and noise generation. DE 20 2014 000 738 U1 discloses a wheel loader having an electric motor that drives an axle of the wheel loader via a non-shiftable transmission.

SUMMARY

In an embodiment, the present invention provides an electric drive arrangement for a drive train of a work machine. The electric drive arrangement includes a multi gear transmission. The multi gear transmission includes at least two gears that provide different transmission ratios for various driving modes of the work machine, a multi gear transmission drive, and a multi gear transmission output configured to be mechanically coupled to an axle of the drive train. The electric drive arrangement further includes an electric motor configured to drive a driving movement of the work machine via a shaft that is mechanically coupled to the multi gear transmission drive of the multi gear transmission.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
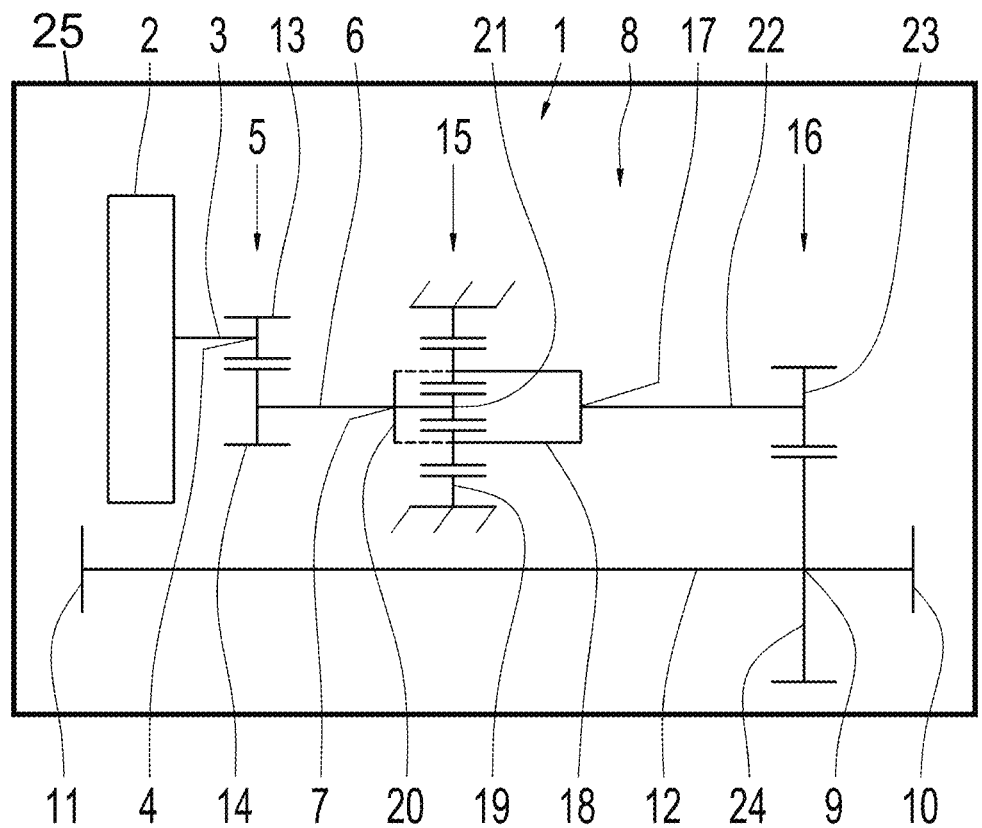
FIG. 1 illustrates schematically the construction of an electric drive train of a work machine in accordance with an embodiment.

The present disclosure relates to an electric drive arrangement for a drive train of a work machine. The drive arrangement is used to drive a driving movement of the work machine. The driving movement may be a forward movement and or rearward movement. The work machine may be a construction machine, an agricultural machine or another work machine. The work machine may be a tractor. The work machine may likewise be a driven trailer having a dedicated drive. The drive arrangement comprises a multi gear transmission having at least 2 gears. The gears provide different transmission ratios in order to therefore render it possible to operate the work machine in various driving modes. The transmission ratios may be a rotational speed transmission and/or a torque transmission. The term a "rotational speed transmission" is understood to mean the quotient of the input rotational speed and output rotational speed of a transmission. The term a "torque transmission" is understood to mean the quotient of the output torque and input torque of the transmission.

Moreover, the multi gear transmission comprises a multi gear transmission drive and a multi gear transmission output. The force that is to be transmitted is fed to the drive of a transmission while the transmitted force is output at the output of a transmission. The multi gear transmission output of the multi gear transmission may be mechanically coupled to an axle of the drive train. A mechanical coupling of two components renders it possible to transmit a force or a torque from the one component to the other component in a mechanical manner. In this case, further components may be provided between the two components, said further components rendering possible such a transmission of force or transmission of torque between the two components.

Furthermore, the electric drive arrangement comprises an electric motor that is suitable for driving a driving movement of a work machine. The electric motor comprises a shaft that is mechanically coupled to the multi gear transmission drive of the multi gear transmission. The electric motor may be a synchronous and/or asynchronous and/or reluctance motor.

It is possible by means of providing a multi gear transmission having various gears to optimize the drive torque, which is provided by means of the electric motor, to various operating modes. As a consequence, it is possible to reduce the size of the electric motor and the power electronic system. It is consequently possible to easily convert by way of example existing work machines having a diesel engine to an electric drive. Work machines of this type namely frequently comprise multi gear transmissions in accordance with the above design. If the electric motor is coupled to the existing multi gear transmission, this renders it possible to design the electric motor in a compact manner. It is possible owing to such a compact design for the electric motor to in turn be easily integrated into existing machines.

The multi gear transmission may comprise a working gear for performing working tasks of the work machine and a road gear for transportation journeys of the work machine on the road. The term "working tasks" is understood to mean working procedures for which the work machine is designed. Working procedures of a wheel loader are by way of example loading and moving bulk material on a building site. A high torque is required at the wheels for this purpose, which is why the working gear comprises a high transmission ratio. Conversely, if the work machine is to perform a transportation journey on a road, a high travelling speed is central. For this purpose, the multi gear transmission may provide a lower transmission ratio with the result that a high rotational speed may be realized at the output. The transmission ratio of the multi gear transmission in the road gear may amount to by way of example 1.

The multi gear transmission may comprise a planetary gear, which results in a compact construction and therefore easy integration into work machines. In addition to the planetary gear, the multi gear transmission may comprise further gear stages, by way of example a spur gear stage. Moreover, the planetary gear may be replaced by means of a spur gear stage or any arbitrary other transmission form.

In accordance with one embodiment, the multi gear transmission is power shiftable. This means that the transmission may be changed under load, in other words while travelling, without interrupting the torque. For this purpose, the multi gear transmission may comprise shifting elements that are embodied as friction clutches, by way of example multi plate clutches.

Moreover, the multi gear transmission may comprise a clutch in order to interrupt the flow of force between the electric motor and the multi gear transmission. The clutch may be one or multiple of the above friction clutches. Alternatively, a separate clutch is also conceivable here. If the electric drive arrangement is provided by way of example in a trailer, it is possible by means of the clutch to disconnect the electric motor from the axles of the trailer. As a consequence, it is possible to avoid damaging said axles at high pulling speeds.

The multi gear transmission may be a transmission that is embodied and configured for use with a diesel motor of a work machine. In other words, the multi gear transmission may be a transmission, which is operated in a conventional manner in conjunction with a diesel engine of a work machine. It is therefore possible to provide a cost-efficient system because components that are already provided may be operated in conjunction with the electric motor. It is likewise rendered possible to effectively retrofit existing work machines with an electric motor.

The drive arrangement may furthermore comprise a reduction gear. The term a "reduction" is understood to mean the transmission of a rotational speed at the transmission drive into a slower rotational speed at the transmission output. The reduction of the reduction gear may accompany an increase in torque at the transmission output with respect to the transmission drive. The reduction gear may comprise a reduction gear drive that is mechanically coupled to the shaft of the electric motor. The reduction gear may likewise comprise a reduction gear output that is mechanically coupled to the multi gear transmission drive of the multi gear transmission. The coupling arrangements may be non-rotatable connections. The reduction gear renders it possible to use an electric motor having a high rotational speed in conjunction with an existing drive train. The electric motor comprises a compact construction owing to the high rotational speed of said electric motor. The provision of the reduction gear renders it possible therefore to easily integrate the electric motor into existing work machines.

The reduction gear may be embodied as a planetary gear. This contributes to a compact construction of the drive arrangement. Alternatively, the reduction gear may also be embodied as a spur gear or portal gear. In accordance with one embodiment, the reduction gear is integrated into the transfer case. This is to be understood to mean the two elements forming a single unit or a single component. The result is a compact electric drive arrangement that may be easily integrated into work machines and provides an efficient use of the space.

Moreover, the present disclosure relates to an electric drive train for a work machine. The drive train comprises a front axle, a rear axle and an electric drive arrangement in accordance with one of the preceding embodiments. Front wheels or rear wheels may be mounted on the front axle and/or the rear axle. The multi gear transmission output of the multi gear transmission may be mechanically coupled to the rear axle and/or the front axle. With regard to the understanding of the individual features and their advantages, reference is made to the above statements.

Moreover, it is conceivable that the drive train comprises a first electric drive arrangement in accordance with one of the above-described embodiments for driving the rear axle. Furthermore, the drive train may comprise a second further electric drive arrangement in accordance with one of the above described embodiments for driving the front axle. It is likewise possible that the drive train in addition to the electric motor comprises a further drive machine by way of example an internal combustion engine and/or a fuel cell.

Furthermore, the drive train may comprise a drive shaft. The front axle may be mechanically coupled via the driveshaft to the multi gear transmission output of the multi gear transmission. By way of example, a torque may therefore be transmitted to the front axle of a wheel loader having an articulated steering arrangement in which the multi gear transmission output is provided in the region of the rear axle.

The present disclosure moreover relates to a work machine having an electric drive train in accordance with one of the above-described embodiments. The work machine may be a construction machine, by way of example a wheel loader. The work machine may likewise be a trailer. With regard to the understanding of the individual features and their advantages, reference is made to the above statements.

Furthermore, the present disclosure relates to a method for retrofitting a work machine with an electric drive. The term "retrofitting an electric drive" is understood to mean exchanging an existing drive for an electric drive. The method comprises providing a work machine having a multi gear transmission. The multi gear transmission is embodied in accordance with one of the above-described embodiments. Moreover, the work machine comprises a drive machine for driving a driving movement of the work machine. The drive machine may be a diesel motor. The drive machine is mechanically coupled to the multi gear transmission with the result that a driving movement of the work machine may be driven via the drive machine and the multi gear transmission.

The method comprises dismounting the drive machine. In other words, the existing drive of the work machine is removed. The drive that is to be removed may be an original drive or drive that has already been retrofitted. Furthermore, the method comprises mounting an electric motor in the installation space of the drive machine that is removed. The electric motor is suitable for driving a driving movement of the work machine. The electric motor is coupled to the multi gear transmission that is already provided in the work machine with the result that the wheels of the work machine may be driven via the electric motor and the multi gear transmission. A reduction gear may also optionally be provided in the drive train between the electric motor and the multi gear transmission. It is possible using the reduction gear to reduce the rotational speed of the electric motor. With regard to the understanding of the individual features and their advantages, reference is made to the above statements.

An embodiment of a drive train 1 for a work machine 25, e.g. a wheel loader, is described below with reference to FIG. 1.

The drive train 1 comprises an electric motor 2 having a shaft 3, a reduction gear 5 and a multi gear transmission 8. The reduction gear 5 comprises a reduction gear drive 4, which is connected in a non-rotatable manner to the shaft 3 of the electric motor 2. Moreover, the reduction gear 5 comprises a reduction gear output 6, which is connected in a non-rotatable manner to a multi gear transmission drive 7 of the multi gear transmission 8. The multi gear transmission output 9 of the multi gear transmission 8 is mechanically coupled to a rear axle 10 of the drive train 1. The front axle 11 of the drive train 1 is mechanically coupled via a drive shaft 12 to the multi gear transmission output 9 of the multi gear transmission 8. The drive train 1 of this embodiment is therefore embodied so as to transmit a power that is output by the electric motor 2 via the reduction gear 5 and the multi gear transmission 8 to the front axle 11 and rear axle 10 of the drive train 1. The electric motor 2 in this embodiment provides a maximum rotational speed of 10,000 rpm.

In this embodiment, the reduction gear 5 comprises a spur gear stage having a pinion 13, which is connected in a non-rotatable manner to the reduction gear drive 4. A wheel 14 is in meshing engagement with the pinion 13, said wheel being connected in a non-rotatable manner to the reduction gear output 6. The transmission ratio of the spur gear stage 5 amounts to 3 in this embodiment, wherein other transmissions are also conceivable here.

The multi gear transmission 8 of this embodiment comprises a planetary gear 15 and a spur gear 16. The planetary gear output 17 of the planetary gear 15 is coupled in a non-rotatable manner to the planetary gear carrier 18. The ring gear 19 of the planetary gear 15 is fixed in this embodiment. Furthermore, the multi gear transmission 8 comprises a clutch 20 via which it is possible to connect the multi gear transmission drive 7 of the multi gear transmission 8 selectively in a non-rotatable manner either to the sun wheel 21 of the planetary gear 15 or to the planetary gear carrier 18. Furthermore, it is possible via the clutch 20 to entirely interrupt the flow of force between the electric motor 2 and the multi gear transmission 15.

The planetary gear output 17 is connected in a non-rotatable manner to the spur gear drive 22 of the spur gear 16 of the multi gear transmission 8. The spur gear 16 comprises a pinion 23 that is connected in a non-rotatable manner to the spur gear drive 22 and a wheel 24 that meshes with the pinion 23. The wheel 24 is connected in a non-rotatable manner to the multi gear transmission output 9 of the multi gear transmission 8. The spur gear stage 16 in this embodiment is a reduction gear stage.

The electric motor 2 comprises a high rotational speed, which reduces via the reduction gear stage 5 into the multi gear transmission 8. A working gear may be selected via the clutch 20 and in said working gear the multi gear transmission drive 7 of the multi gear transmission 8 is connected in a non-rotatable manner to the sun wheel 21 of the planetary gear 18. In the working gear, a further reduction is provided by means of the planetary gear 15, which is why a relatively high torque may be provided at the planetary gear output 17.

Alternatively, it is possible via the clutch 20 for the multi gear transmission drive 7 of the multi gear transmission 8 to be coupled in a non-rotatable manner to the planetary gear carrier 18 in order to select a road gear for transportation journeys. In the road gear, the multi gear transmission drive 7 of the multi gear transmission 8 is coupled without transmission/reduction directly to the planetary gear output 17. A relatively high speed may accordingly be provided at the planetary gear output 17 of the planetary gear 15.

The rotational speed ratios or torque ratios at the planetary gear output 17 of the planetary gear 15 are transmitted via the spur gear 16 of the multi gear transmission 8 to the front axle 11 and rear axle 10 of the drive train 1.

Figure 2:
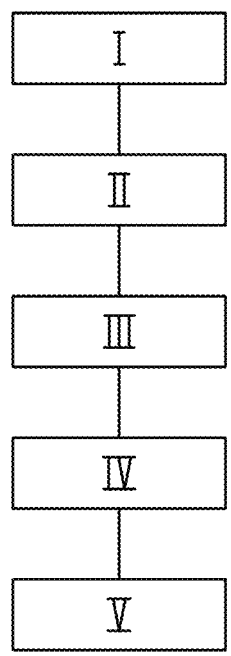
FIG. 2 illustrates method steps of a method for retrofitting a work machine with an electric drive in accordance with an embodiment.
Figure 3:
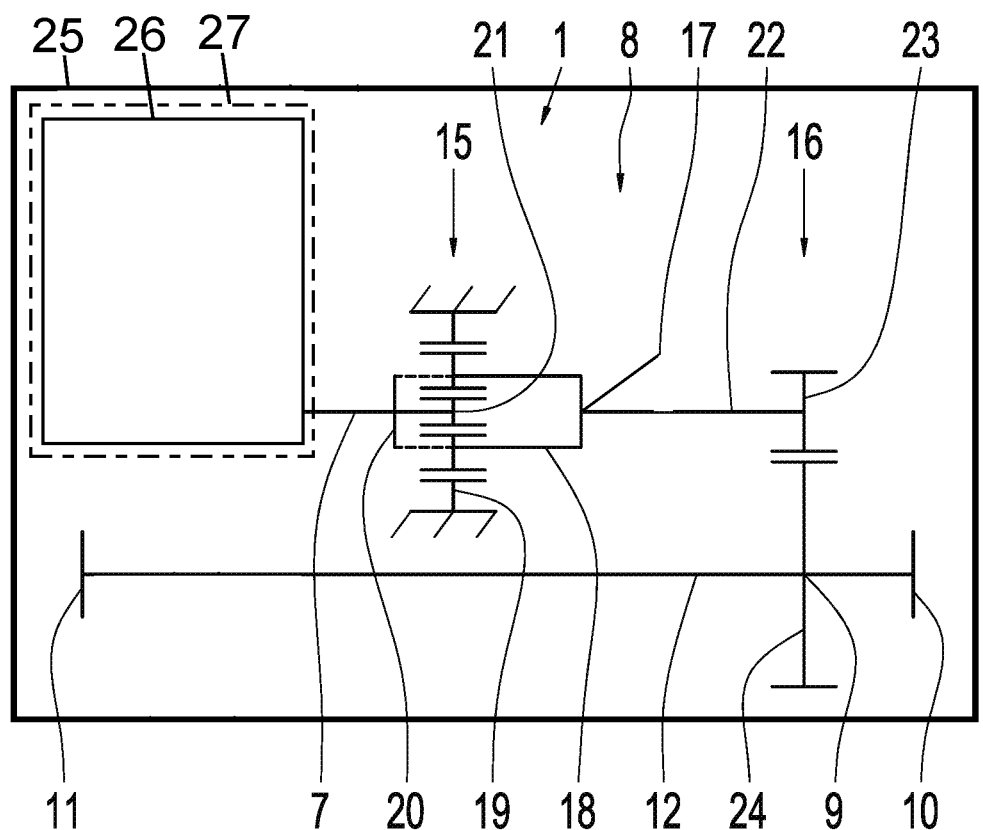
FIG. 3. depicts a work machine that includes a drive machine, e.g. including a diesel motor, and an installation space in which the drive machine is located.

An embodiment of a method for retrofitting an electric drive is described below with reference to FIG. 2.

In a first step I, a work machine 25 is provided that comprises a drive machine 26, e.g. a diesel motor, and a multi gear transmission 8 that is mechanically coupled to the diesel motor. A travelling movement of the work machine may be driven via the diesel motor. The multi gear transmission 8 is embodied in this embodiment in accordance with the above described embodiment and is accordingly mechanically connected to a front axle 11 and a rear axle 10.

In a second step II, the diesel motor is removed from the work machine. In this context, the clutch between the diesel motor and the multi gear transmission drive 7 of the multi gear transmission 8 is released.

In a following step III, an electric motor 2 is mounted in the installation space 27 that has become free, said electric motor being suitable for driving a travelling movement of the work machine. Moreover, in this embodiment in a step IV a reduction gear 5 is provided in accordance with the above described embodiment in the installation space that is cleared.

In a step V, the electric motor 2 is mechanically connected via the reduction gear 5 that is provided to the multi gear transmission drive 7 of the multi gear transmission 8. In this context, a non-rotatable connection is produced between the shaft 3 of the electric motor 2 and the reduction gear drive 4 of the reduction gear stage 5. A non-rotatable connection is likewise produced between the reduction gear output 6 and the multi gear transmission drive 7 of the multi gear transmission 8. An output power of the retrofitted electric motor 2 may be transmitted via the retrofitted reduction gear 5 and the existing multi gear transmission 8 to the axles 10, 11 of the work machine.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Drive train
2 Electric motor
3 Shaft
4 Reduction gear drive
5 Reduction gear
6 Reduction gear output
7 Multi gear transmission drive
8 Multi gear transmission
9 Multi gear transmission output
10 Rear axle
11 Front axle
12 Drive shaft
13 Pinion reduction gear
14 Wheel reduction gear
15 Planetary gear
16 Spur gear
17 Planetary gear output
18 Planetary gear carrier
19 Ring gear
20 Clutch
21 Sun wheel
22 Spur gear drive
23 Pinion spur gear
24 Wheel spur gear
I Providing a work machine with multi gear transmission
II Dismounting drive machine
III Mounting electric motor
IV Mounting reduction gear
V Coupling electric motor to multi gear transmission

The invention claimed is:

1. An electric drive arrangement for a drive train of a work machine, comprising:
a multi gear transmission including:
a multi gear transmission drive,
a planetary gear including a sun wheel and a planetary gear carrier,
a clutch configured to (i) non-rotatably couple the multi gear transmission drive to the sun wheel to provide a first gear that provides a first transmission ratio for a first driving mode and (ii) non-rotatably couple the multi gear transmission drive to the planetary carrier to provide a second gear that provides a second transmission ratio for a second driving mode;
a multi gear transmission output configured to be mechanically coupled to an axle of the drive train; and
an electric motor configured for replacing a non-electric drive machine of the work machine to provide for retrofitting the work machine, the electric motor being configured to be mounted in an installation space provided by a dismounting of the non-electric drive machine, the electric motor comprising a transfer case into which a reduction gear is integrated, the reduction gear having a reduction gear drive and a reduction gear output, wherein the reduction gear drive is mechanically coupled to the shaft of the electric motor and the reduction gear output is mechanically coupled to the multi gear transmission drive of the multi gear transmission such that the electric motor is mechanically coupled, via the reduction gear, with the multi gear transmission drive, wherein the electric motor is further configured to drive a driving movement of the work machine via the mechanical coupling with the multi gear transmission,
wherein the reduction gear comprises a spur gear including a pinion connected in a non-rotatable manner to the reduction gear drive and a wheel in meshing engagement with the pinion, the wheel connected in a non-rotatable manner to the reduction gear output.

2. The electric drive arrangement as claimed in claim 1, wherein the first gear is a working gear for performing working tasks and the second gear is a road gear for transportation journeys of the work machine, wherein the first transmission ratio is a higher transmission ratio than the second transmission ratio.

3. The electric drive arrangement as claimed in claim 1, wherein the multi gear transmission is configured to powershift.

4. The electric drive arrangement as claimed in claim 1, wherein the multi gear transmission is configured to be driven by the non-electric drive machine, the non-electric drive machine comprising a diesel motor.

5. An electric drive train for a work machine, comprising:
a front axle;
a rear axle; and
an electric drive arrangement as claimed in claim 1,
wherein the multi gear transmission output of the multi gear transmission is mechanically coupled to at least one of the rear axle or the front axle.

6. The electric drive train as claimed in claim 5 wherein the front axle is mechanically coupled via a drive shaft to the multi gear transmission output of the multi gear transmission.

7. A work machine having an electric drive train as claimed in claim 5.

8. The work machine as claimed in claim 7, wherein the work machine is a wheel loader.

9. The electric drive arrangement as claimed in claim 1, further comprising a second spur gear, the second spur gear comprising:
a spur gear drive connected in a non-rotatable manner to the multi gear transmission output,
a second pinion connected in a non-rotatable manner to the spur gear drive, and
a second wheel that meshes with the second pinion.

10. The electric drive arrangement as claimed in claim 1, wherein the clutch is a multi-plate friction clutch.

11. The electric drive arrangement as claimed in claim 9, wherein the clutch is a multi-plate friction clutch.

12. A method for retrofitting a work machine with an electric drive, the method comprising:
providing a work machine comprising:
a multi gear transmission, and
a drive machine for driving a driving movement of the work machine, the drive machine being mechanically coupled to the multi gear transmission;
dismounting the drive machine of the work machine;
mounting an electric motor for driving a driving movement of the work machine in an installation space of the dismounted drive machine, the electric motor comprising a transfer case into which a reduction gear is integrated, the reduction gear having a reduction gear drive and a reduction gear output, wherein the reduction gear drive is mechanically coupled to the shaft of the electric motor, wherein the reduction gear comprises a spur gear including a pinion connected in a non-rotatable manner to the reduction gear drive and a wheel in meshing engagement with the pinion, the wheel connected in a non-rotatable manner to the reduction gear output; and mechanically coupling the reduction gear output to the multi gear transmission drive of the multi gear transmission such that the electric motor is mechanically coupled, via the reduction gear, to the multi gear transmission of the work machine with the result that a driving movement of the work machine may be driven via the electric motor and the multi gear transmission, wherein the multi gear transmission includes:
- a multi gear transmission drive,
- a planetary gear including a sun wheel and a planetary gear carrier, and a clutch configured to (i) non-rotatably couple the multi gear transmission drive to the sun wheel to provide a first gear that provides a first transmission ratio for a first driving mode and (ii) non-rotatably couple the multi gear transmission drive to the planetary carrier to provide a second gear that provides a second transmission ratio for a second driving mode.

* * * * *